US012791114B2

(12) United States Patent
Xuan et al.

(10) Patent No.: US 12,791,114 B2
(45) Date of Patent: Nov. 10, 2026

(54) MAIN VALVE SEAT AND FOUR-WAY VALVE

(71) Applicant: ZHEJIANG DUNAN ARTIFICIAL ENVIRONMENT CO., LTD., Shaoxing (CN)

(72) Inventors: Qijie Xuan, Shaoxing (CN); Fei Zhang, Shaoxing (CN); Feilong Du, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 262 days.

(21) Appl. No.: 18/706,328

(22) PCT Filed: Oct. 28, 2022

(86) PCT No.: PCT/CN2022/128314
§ 371 (c)(1),
(2) Date: Apr. 30, 2024

(87) PCT Pub. No.: WO2023/083022
PCT Pub. Date: May 19, 2023

(65) Prior Publication Data

US 2026/0139754 A1 May 21, 2026

(30) Foreign Application Priority Data

Nov. 11, 2021 (CN) ......................... 202122759030.9

(51) Int. Cl.
*F16K 27/10* (2006.01)
*F16K 11/00* (2006.01)
(Continued)

(52) U.S. Cl.
CPC .............. *F16K 27/10* (2013.01); *F16K 11/00* (2013.01); *F16K 11/06* (2013.01); *F16K 11/065* (2013.01)

(58) Field of Classification Search
CPC .......... F16K 27/10; F16K 27/00; F16K 11/00; F16K 11/06; F16K 11/065
See application file for complete search history.

(56) References Cited

FOREIGN PATENT DOCUMENTS

CN 201412575 2/2010
CN 102052481 A 5/2011
(Continued)

OTHER PUBLICATIONS

English translation of Zhejiang Sanhua CN-102052481-A (Year: 2011).*
(Continued)

*Primary Examiner* — John Bastianelli
(74) *Attorney, Agent, or Firm* — The Sun IP Law

(57) ABSTRACT

Disclosed is a main valve seat. The main valve seat includes a first straight side, a cambered side, a second straight side, and a bottom side on a radial section of the main valve seat, wherein two ends of the cambered edge are connected to a first end of the first straight side and a first end of the second straight side respectively, and two ends of the bottom side are connected to a second end of the first straight side and a second end of the second straight side respectively; the first straight side and the second straight side are positioned in a circle in which the cambered side is positioned; and $\alpha$ denotes an inner angle between the first straight side and the bottom side, $\beta$ denotes an inner angle between the second straight side and the bottom side, $\alpha<90°$, and $\beta<90°$. Further disclosed is a four-way valve.

13 Claims, 3 Drawing Sheets

(51) Int. Cl.
*F16K 11/06* (2006.01)
*F16K 11/065* (2006.01)

(56) References Cited

FOREIGN PATENT DOCUMENTS

| | | | | |
|---|---|---|---|---|
| CN | 205207834 U | * | 5/2016 | |
| CN | 108930816 | | 12/2018 | |
| CN | 108930816 B | * | 4/2021 | ............ F16K 27/04 |
| CN | 214618417 U | | 11/2021 | |
| CN | 216479264 U | | 5/2022 | |
| JP | 02299769 | | 12/1990 | |

OTHER PUBLICATIONS

English translation of Zhejiang Sanhua Co Ltd CN-205207834-U (Year: 2016).*
English translation of Zhejiang Sanhua Refrigeration CN-108930816-A (Year: 2018).*
1 The first office action of counterpart KR application No. 10-2024-7014835 issued on Sep. 15, 2025.

* cited by examiner

MAIN VALVE SEAT AND FOUR-WAY VALVE

CROSS-REFERENCE TO RELATED APPLICATION

The present disclosure is a national stage application of International Patent Application No. PCT/CN2022/128314, which is filed on Oct. 28, 2022. The International Patent Application claims the priority of Chinese Application No. 202122759030.9, filed in the Chinese Patent Office on Nov. 11, 2021, and entitled "Main Valve Seat and Four-Way Valve", the entire contents of which are herein incorporated by reference.

TECHNICAL FIELD

The disclosure relates to the technical field of four-way valves, and in particular to a main valve seat and a four-way valve.

BACKGROUND

For a main valve seat of a four-way valve in an art known to inventors, an inner angle formed between a first straight side and a bottom side and an inner angle formed between the second straight side and the bottom side are greater than or equal to 90°, leading to a short length of the bottom side. In consequence, a material utilization rate of the main valve seat is reduced, and a machining cost is increased. Moreover, owing to restrictive requirements on other sizes of the main valve seat, the first straight side and the second straight side of the main valve seat cannot be secondarily machined, so that the main valve seat is limited in an application range.

SUMMARY

Some embodiments of the disclosure provide a main valve seat and a four-way valve, so as to increase a material utilization rate of the main valve seat and reduce a machining cost.

In an aspect, some embodiments of the disclosure provide a main valve seat. The main valve seat includes a first straight side, a cambered side, a second straight side, and a bottom side on a radial section of the main valve seat, wherein two ends of the cambered side are connected with a first end of the first straight side and a first end of the second straight side respectively, and two ends of the bottom side are connected to a second end of the first straight side and a second end of the second straight side respectively; the first straight side and the second straight side are positioned in a circle in which the cambered side is positioned; and $\alpha$ denotes an inner angle between the first straight side and the bottom side, $\beta$ denotes an inner angle between the second straight side and the bottom side, $\alpha<90°$, and $\beta<90°$.

In some embodiments, the main valve seat extends in a preset direction, and an end surface of the main valve seat is perpendicular to the preset direction; the main valve seat is provided with a plurality of mounting holes arranged at intervals in the preset direction, each of the plurality of mounting holes includes a first hole section and a second hole section that communicate with each other, and the first hole section and the second hole section are coaxially arranged; and D1 denotes a radial size of the first hole section, D2 denotes a radial size of the second hole section, and $D2>D1$.

In some embodiments, A denotes a length of the bottom side; when $D1+4\geq 1.5D1$, $A\geq 2D1+4$; and when $D1+4<1.5D1$, $(D1+4)$ mm$<A<1.5D1$ mm.

In some embodiments, A denotes a length of the bottom side, H denotes a maximum distance between the cambered side and the bottom side, R denotes a radius of the cambered side, wherein $(2R-D1-2)$ mm$\leq H\leq(2R-D1-9)$ mm, and $R=\sqrt{((A/2)^2+(R-H)^2)}$.

In some embodiments, H denotes a maximum distance between the cambered side and the bottom side, R denotes a radius of the cambered side, and h denotes a depth of the second hole section, wherein $(D2-D1)/2=t$, $h=H-1.5-\sqrt{(R^2+(D2/2)^2)}$, and $h>3t$.

In some embodiments, on a section perpendicular to the preset direction and passing through an axis of the mounting hole, the first straight side and the second straight side are symmetrically arranged with respect to the axis of the mounting hole; point E denotes an intersection point between the mounting hole and the cambered side, and point E and the first straight side are positioned on a same side of the axis of the mounting hole; and L denotes a length of an arc line, between point E and the first straight side, of the cambered side, and 2 mm$\leq L\leq$5 mm.

In some embodiments, $\alpha=\beta$, and a length of the first straight side equals a length of the second straight side.

In some embodiments, chamfers are provided at a joint between the first straight side and the bottom side and a joint between the second straight side and the bottom side.

In another aspect, the disclosure provides a four-way valve. The four-way valve includes a valve sleeve and the above main valve seat, wherein the main valve seat is arranged in the valve sleeve.

In some embodiments, on a radial section of the valve sleeve, a region between a first straight side and an inner wall of the valve sleeve serves as a first storage region, a region between a second straight side and the inner wall of the valve sleeve serves as a second storage region, and the first storage region and the second storage region are configured to store solder.

By applying the technical solutions of the disclosure, the main valve seat is provided. The main valve seat includes the first straight side, the cambered side, the second straight side, and the bottom side on the radial section of the main valve seat, wherein the two ends of the cambered side are connected to the first end of the first straight side and the first end of the second straight side respectively, and the two ends of the bottom side are connected to the second end of the first straight side and the second end of the second straight side respectively; the first straight side and the second straight side are positioned in the circle in which the cambered side is positioned; and a denotes the inner angle between the first straight side and the bottom side, $\beta$ denotes the inner angle between the second straight side and the bottom side, $\alpha<90°$, and $\beta<90°$. With the technical solution employed, on the premise that other sizes of the main valve seat, such as a height of the main valve seat, and the radius and a length of the cambered side are the same as one another, under the limitations in the solution, the inner angle $\alpha$ is smaller than 90°, and the inner angle $\beta$ is smaller than 90°; and compared with the condition that an inner angle $\alpha$ and an inner angle $\beta$ are greater than or equal to 90° in the prior art, through an arrangement manner in the solution, the length of the bottom side is increased, so that a material utilization rate of the main valve seat is increased, and a machining cost is reduced. Moreover, through such an arrangement, the inner angle $\alpha$ and the inner angle $\beta$ of the main valve seat may be set to be large first, and then the first straight side and the second straight side are secondarily machined according to an actual situation. Therefore, the inner angle α and the inner angle β are set to be smaller correspondingly, and the adjustability of the main valve seat is improved.

BRIEF DESCRIPTION OF THE DRAWINGS

The accompanying drawings of the description are used for providing further understanding of the disclosure as a constituent part of the disclosure. Illustrative embodiments of the disclosure and their descriptions serve to explain the disclosure, instead of limiting the disclosure improperly. In the accompanying drawings.

Figure 1:
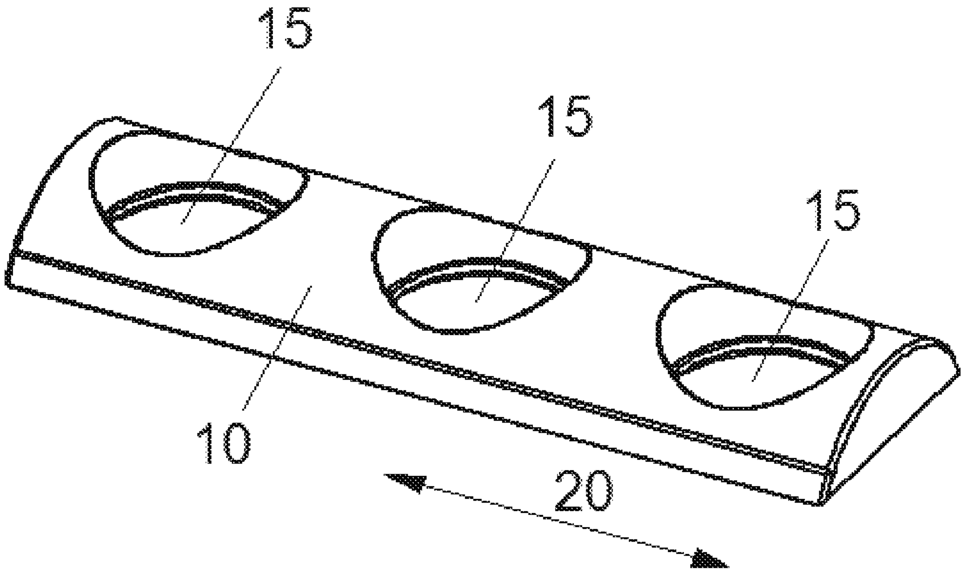
FIG. 1 shows a schematic structural diagram of a main valve seat according to an embodiment of the disclosure.

The above accompanying drawings include the reference numerals as follows:

10. main valve seat; 11. first straight side; 12. cambered side; 13. second straight side; 14. bottom side; 15. mounting hole; 151. first hole section; 152. second hole section; 20. preset direction; 30. valve sleeve; 41. first storage region; and 42. second storage region.

DETAILED DESCRIPTION OF THE EMBODIMENTS

The technical solutions in embodiments of the disclosure are described clearly and completely below with reference to the accompanying drawings in the embodiments of the disclosure. Apparently, the embodiments described are merely some embodiments rather than all embodiments of the disclosure. The following description of at least one illustrative embodiment is merely descriptive in nature and is definitely not intended to limit the disclosure and its application or use in any way. Based on the embodiments of the disclosure, all other embodiments derived by those of ordinary skill in the art without creative efforts fall within the protection scope of the disclosure.

As shown in FIGS. 1-6, a main valve seat is provided in an embodiment of the disclosure. The main valve seat 10 includes a first straight side 11, a cambered side 12, a second straight side 13, and a bottom side 14 on a radial section of the main valve seat 10, wherein two ends of the cambered side 12 are connected to a first end of the first straight side 11 and a first end of the second straight side 13 respectively, and two ends of the bottom side 14 are connected to a second end of the first straight side 11 and a second end of the second straight side 13 respectively; the first straight side 11 and the second straight side 13 are positioned in a circle in which the cambered side 12 is positioned; and α denotes an inner angle between the first straight side 11 and the bottom side 14, β denotes an inner angle between the second straight side 13 and the bottom side 14, $\alpha<90°$, and $\beta<90°$.

In the embodiment, on the premise that other sizes of the main valve seat 10, such as a height of the main valve seat 10, and a radius and a length of the cambered side 12 are the same as one another, under the limitations in the solution, the inner angle α is smaller than 90°, and the inner angle β is smaller than 90°; and compared with the condition that an inner angle α and an inner angle β are greater than or equal to 90° in a prior art, through an arrangement manner in the solution, a length of the bottom side 14 is increased, so that a material utilization rate of the main valve seat 10 is increased, and a machining cost is reduced. Moreover, through such an arrangement, the inner angle α and the inner angle β of the main valve seat 10 may be set to be large first, and then the first straight side 11 and the second straight side 13 are secondarily machined according to an actual situation. Therefore, the inner angle α and the inner angle β are set to be smaller correspondingly, and the adjustability of the main valve seat 10 is improved.

Figure 2:
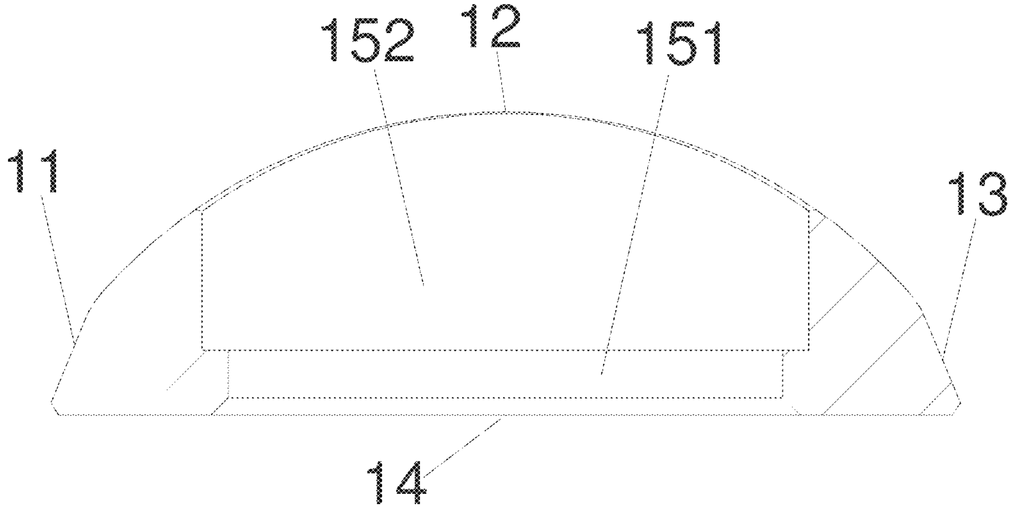
FIG. 2 shows a sectional view of the main valve seat in FIG. 1.
Figure 3:
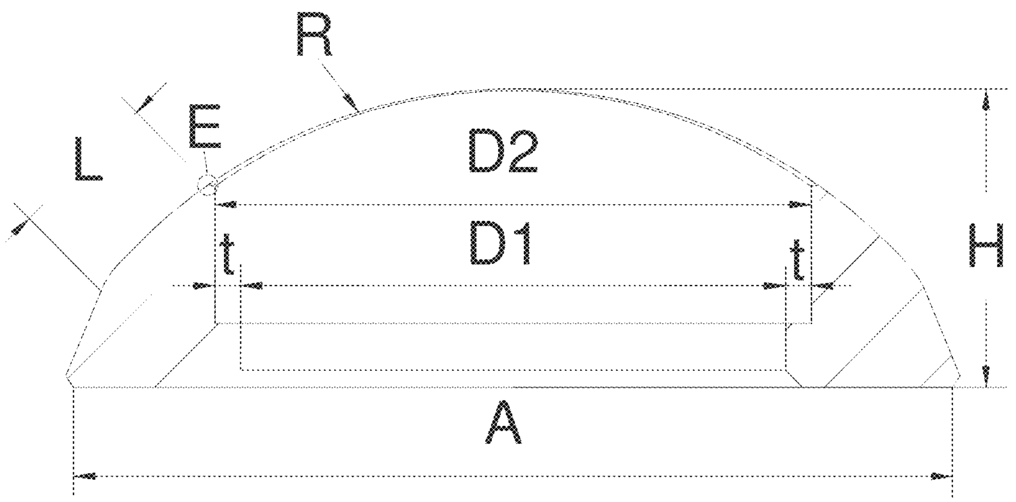
FIG. 3 shows a schematic diagram of a size of the main valve seat in FIG. 2.
Figure 4:
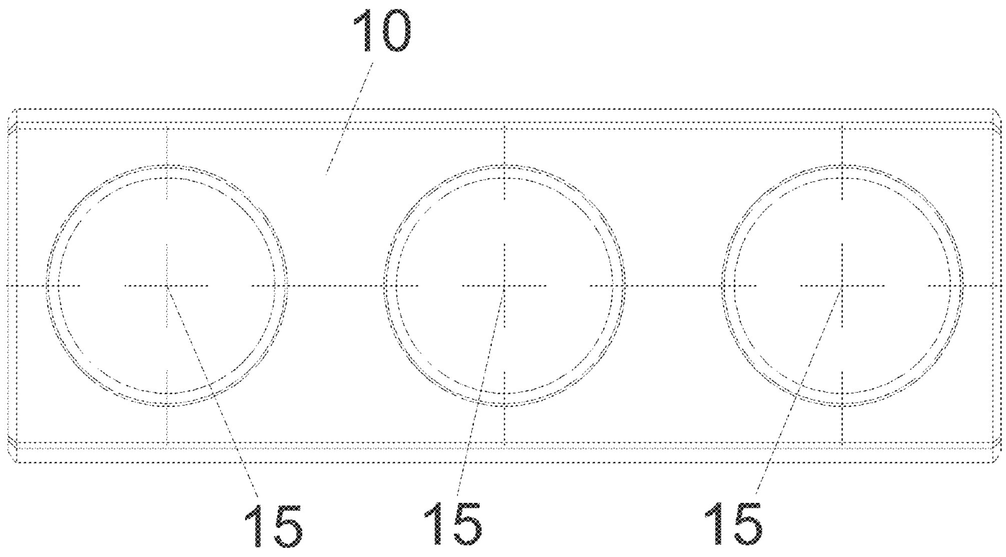
FIG. 4 shows a top view of the main valve seat in FIG. 1.
Figure 5:
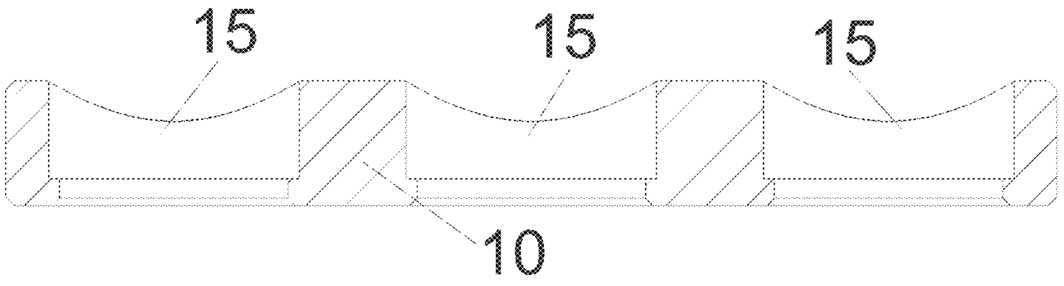
FIG. 5 shows a sectional view of the main valve seat in FIG. 1 from another perspective.

As shown in FIGS. 1 and 2, in some embodiments, the main valve seat 10 extends in a preset direction 20, and an end surface of the main valve seat 10 is perpendicular to the preset direction 20; the main valve seat 10 is provided with a plurality of mounting holes 15 arranged at intervals in the preset direction 20, each of the plurality of mounting holes 15 includes a first hole section 151 and a second hole section 152 that communicate with each other, and the first hole section 151 and the second hole section 152 are coaxially arranged; and D1 denotes a radial size of the first hole section 151, D2 denotes a radial size of the second hole section 152, and $D2>D1$. Through such an arrangement, a step between the first hole section 151 and the second hole section 152 limits an external connection pipe inserted into the main valve seat 10, thereby ensuring the reliability of connection between the main valve seat 10 and the external connection pipe.

In some embodiments, A denotes the length of the bottom side 14; when $D1+4\geq 1.5D1$, $A\geq 2D1+4$; and when $D1+4<1.5D1$, $D1+4<A<1.5D1$. Through such an arrangement, it is ensured that on a section perpendicular to the preset direction 20 and passing through an axis of the mounting hole 15, there is always a safety difference between a maximum opening size of the first hole section 151, i.e. D1, and the length A of the bottom side 14. Accordingly, the situation that a maximum opening size D2 of the second hole section 152 is too large, so that portions, on two ends of maximum openings, of the cambered side 12 and positioned on two sides are too short, affecting the sealing performance of the main valve seat 10 will be avoided.

In some embodiments, A denotes the length of the bottom side 14, H denotes a maximum distance between the cambered side 12 and the bottom side 14, R denotes a radius of the cambered side 12, where $(2R-D1-2)\ \text{mm}\leq H\leq(2R-D1-9)\ \text{mm}$, and $R=\sqrt{((A/2)^2+(R-H)^2)}$. Through such an arrangement, the relation among R, H, A, and D1 is defined, so that R, H, A, and D1 may limit one another, ensuring the reliability of the main valve seat.

In some embodiments, H denotes a maximum distance between the cambered side 12 and the bottom side 14, R denotes the radius of the cambered side 12, and h denotes a depth of the second hole sections 152, where $D2-D1/2=t$, $h=H-1.5-\sqrt{R}^2+D2/2^2$, and $h>3t$. Through such an arrangement, by limiting the depth h of the second hole sections 152, remaining portions, on two ends of maximum opening positions of the second hole sections 152, of the cambered side 12 and positioned on the two sides are further prevented from being too short. Accordingly, the sealing performance and reliability of the main valve seat 10 are ensured. Moreover, by limiting h, H, R, D2, t, etc. are further limited, so that the reliability of the main valve seat 10 is ensured.

In some embodiments, as shown in FIG. 2, on the section perpendicular to the preset direction 20 and passing through the axis of the mounting hole 15, the first straight side 11 and the second straight side 13 are symmetrically arranged with respect to the axis of the mounting hole 15; point E denotes an intersection point between the mounting hole 15 and the cambered side 12, and point E and the first straight side 11 are positioned on the same side of the axis of the mounting hole 15; and L denotes a length of an arc line, between point E and the first straight side 11, of the cambered side 12, and 2 mm≤L≤5 mm.

In some embodiments, L denotes an arc length of the remaining portions, on the two ends of the maximum opening positions of the second hole sections 152, of the cambered side 12 and positioned on the two sides on the section perpendicular to the preset direction 20 and passing through the axis of the mounting hole 15. By limiting L, the sealing performance of the main valve seat 10 can be further ensured. Moreover, with L limited, other sizes of the main valve seat 10, such as H, R, A, and h are further indirectly limited, so that the reliability of the main valve seat 10 is ensured.

In some embodiments, α=β, and a length of the first straight side 11 equals a length of the second straight side 13. Through such an arrangement, α=β. Moreover, since the length of the first straight side 11 equals the length of the second straight side 13, the cambered side 12 connected to the first straight side 11 and the second straight side 13 is also of a symmetrical structure. Therefore, it is ensured that the main valve seat 10 is of a symmetrical structure as a whole, and thus is convenient to machine and capable of reducing the machining cost.

Specifically, chamfers are provided at a joint between the first straight side 11 and the bottom side 14 and a joint between the second straight side 13 and the bottom side. With the chamfers arranged, burrs on edges of the main valve seat 10 machined are removed, and parts are convenient to assemble. The chamfers on two sides are the same, and thus are convenient to machine and capable of reducing the machining cost.

In some embodiments, the length A of the bottom side is a difference between a distance from an end, away from the cambered side 12, of the first straight side 11 and an end, away from the cambered side 12, of the second straight side 13, and a total length of two chamfers cut off and positioned on an extension line of the bottom side.

A four-way valve is provided in another embodiment of the disclosure. The four-way valve includes a valve sleeve 30 and the above main valve seat 10, wherein the main valve seat 10 is arranged in the valve sleeve 30. A cambered surface formed by extending a cambered side 12 of the main valve seat 10 is in limiting fit with an inner side wall of the valve sleeve 30. Specifically, the valve sleeve 30 is connected to the main valve seat 10 through welding, so that connection is reliable, and a connection method is simple.

Figure 6:
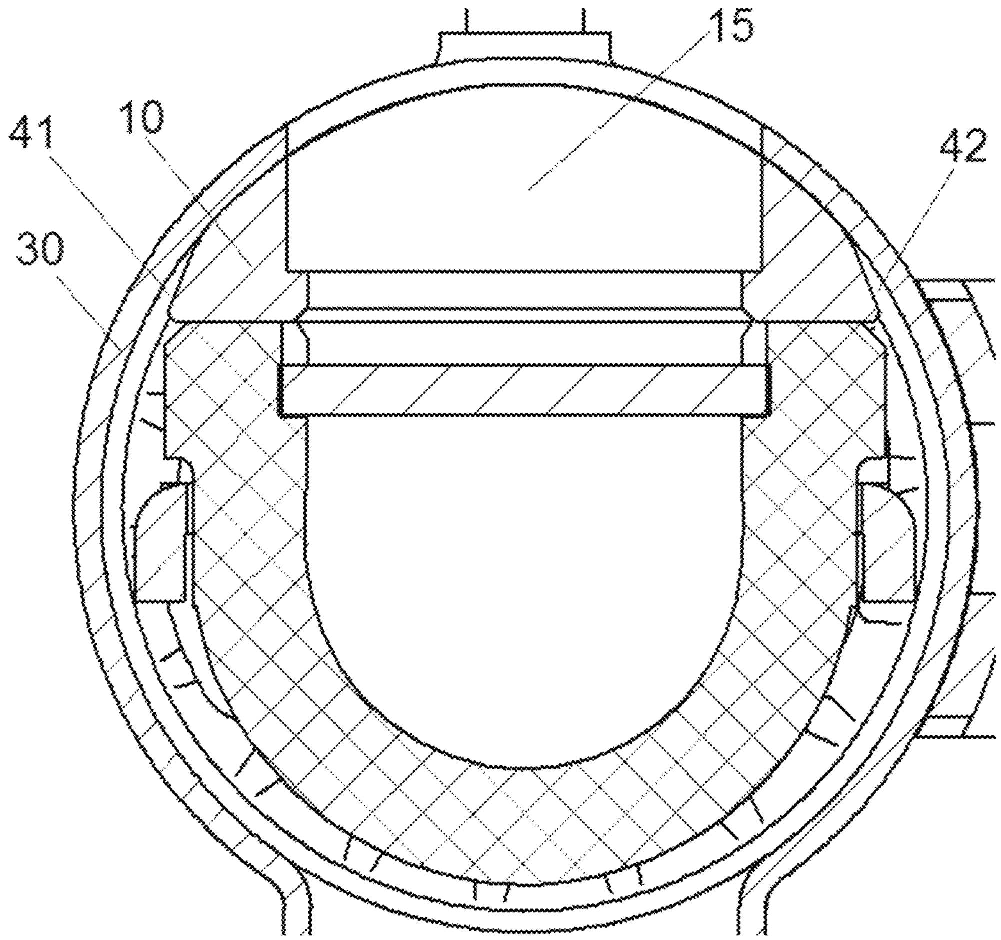
FIG. 6 shows a schematic diagram of connection between a main valve seat and a valve sleeve according to embodiments of the disclosure.

As shown in FIG. 6, on a radial section of the valve sleeve 30, a region between a first straight side 11 and an inner wall of the valve sleeve 30 serves as a first storage region 41, a region between a second straight side 13 and the inner wall of the valve sleeve 30 serves as a second storage region 42, and the first storage region 41 and the second storage region 42 are configured to store solder. Through such an arrangement, the solder is stored in the first storage region 41 and the second storage region 42, so that sufficient solder can be accommodated at a welding position, and the stability and a quality of welding can be ensured. Moreover, the situation that the solder enters a cavity of the valve sleeve to affect the cooperation between other parts inside the valve sleeve can also be prevented, and the reliability of the four-way valve can be ensured.

The described above are merely some embodiments of the disclosure, and are not intended to limit the disclosure. Those skilled in the art can make various changes and variations to the disclosure. Any modifications, equivalent replacements, improvements, etc. made within the spirit and principles of the disclosure should fall within the scope of protection of the disclosure.

What is claimed is:

1. A main valve seat, wherein the main valve seat comprises a first straight side, a cambered side, a second straight side, and a bottom side on a radial section of the main valve seat, wherein two ends of the cambered side are connected with a first end of the first straight side and a first end of the second straight side respectively, and two ends of the bottom side are connected to a second end of the first straight side and a second end of the second straight side respectively; the first straight side and the second straight side are positioned in a circle in which the cambered side is positioned; and α denotes an inner angle between the first straight side and the bottom side, β denotes an inner angle between the second straight side and the bottom side, α<90°, and β<90°;

wherein the main valve seat extends in a preset direction, and an end surface of the main valve seat is perpendicular to the preset direction; the main valve seat is provided with a plurality of mounting holes arranged at intervals in the preset direction, each of the plurality of mounting holes comprises a first hole section and a second hole section that communicate with each other, and the first hole section and the second hole section are coaxially arranged; and D1 denotes a radial size of the first hole section, D2 denotes a radial size of the second hole section, and D2>D1;

wherein A denotes a length of the bottom side; when D1+4≥1.5D1, A≥D1+4; and when D1+4<1.5D1, (D1+4) mm<A<1.5D1 mm.

2. The main valve seat as claimed in claim 1, wherein

A denotes a length of the bottom side, H denotes a maximum distance between the cambered side and the bottom side, R denotes a radius of the cambered side, wherein $$(2R-D1-2)\ \text{mm} \le H \le (2R-D1-9)\ \text{mm, and}$$

$$R=\sqrt{((A/2)^{\wedge}2+(R-H)^{\wedge}2)}.$$

3. The main valve seat as claimed in claim 1, wherein

H denotes a maximum distance between the cambered side and the bottom side, R denotes a radius of the cambered side, and h denotes a depth of the second hole section, wherein (D2−D1)/2=t, h=H−1.5−√(R^2+(D2/2)^2), and h>3t.

4. The main valve seat as claimed in claim 1, wherein on a section perpendicular to the preset direction and passing through an axis of the mounting hole, the first straight side and the second straight side are symmetrically arranged with respect to the axis of the mounting hole; point E denotes an intersection point between the mounting hole and the cambered side, and point E and the first straight side are positioned on a same side of the axis of the mounting hole; and L denotes a length of an arc line, between point E and the first straight side, of the cambered side, and 2 mm≤L≤5 mm.

5. The main valve seat as claimed in claim 1, wherein $\alpha=\beta$, and a length of the first straight side equals a length of the second straight side.

6. The main valve seat as claimed in claim 1, wherein chamfers are provided at a joint between the first straight side and the bottom side and a joint between the second straight side and the bottom side.

7. A four-way valve, comprising a valve sleeve and the main valve seat as claimed in claim 1, wherein the main valve seat is arranged in the valve sleeve.

8. The four-way valve as claimed in claim 7, wherein on a radial section of the valve sleeve, a region between a first straight side and an inner wall of the valve sleeve serves as a first storage region, a region between a second straight side and the inner wall of the valve sleeve serves as a second storage region, and the first storage region and the second storage region are configured to store solder.

9. The four-way valve as claimed in claim 7, wherein A denotes a length of the bottom side, H denotes a maximum distance between the cambered side and the bottom side, R denotes a radius of the cambered side, wherein $$(2R-D1-2)\ \text{mm} \le H \le (2R-D1-9)\ \text{mm, and}$$

$$R=\sqrt{((A/2)^{\wedge}2+(R-H)^{\wedge}2)}.$$

10. The four-way valve as claimed in claim 7, wherein

H denotes a maximum distance between the cambered side and the bottom side, R denotes a radius of the cambered side, and h denotes a depth of the second hole section, wherein (D2−D1)/2=t, h=H−1.5−√(R^2+(D2/2)^2), and h>3t.

11. The four-way valve as claimed in claim 7, wherein on a section perpendicular to the preset direction and passing through an axis of the mounting hole, the first straight side and the second straight side are symmetrically arranged with respect to the axis of the mounting hole; point E denotes an intersection point between the mounting hole and the cambered side, and point E and the first straight side are positioned on a same side of the axis of the mounting hole; and L denotes a length of an arc line, between point E and the first straight side, of the cambered side, and 2 mm≤L≤5 mm.

12. The four-way valve as claimed in claim 7, wherein $\alpha=\beta$, and a length of the first straight side equals a length of the second straight side.

13. The four-way valve as claimed in claim 7, wherein chamfers are provided at a joint between the first straight side and the bottom side and a joint between the second straight side and the bottom side.

* * * * *